US011249673B2

(12) United States Patent
Kronrod et al.

(10) Patent No.: US 11,249,673 B2
(45) Date of Patent: Feb. 15, 2022

(54) PERFORMANCE OF REPLICATION SYSTEM WITH SMALL NUMBER OF IP LINKS AVAILABLE

(71) Applicant: EMC IP Holding Company LLC, Hopkinton, MA (US)

(72) Inventors: Svetlana Kronrod, Concord, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 176 days.

(21) Appl. No.: 16/811,000

(22) Filed: Mar. 6, 2020

(65) Prior Publication Data

US 2021/0278970 A1    Sep. 9, 2021

(51) Int. Cl.
*G06F 3/06*    (2006.01)

(52) U.S. Cl.
CPC .......... *G06F 3/065* (2013.01); *G06F 3/0611* (2013.01); *G06F 3/0659* (2013.01); *G06F 3/0673* (2013.01)

(58) Field of Classification Search
CPC ...... G06F 3/0611; G06F 3/065; G06F 3/0659; G06F 3/0673
See application file for complete search history.

(56) References Cited

U.S. PATENT DOCUMENTS

| 10,055,145 B1 * | 8/2018 | Danilov | G06F 3/067 |
| 10,997,026 B1 * | 5/2021 | Kamran | G06F 3/0689 |
| 2019/0370136 A1 * | 12/2019 | Smeaton | G06F 3/065 |

* cited by examiner

*Primary Examiner* — Zhuo H Li
(74) *Attorney, Agent, or Firm* — Daly, Crowley, Mofford & Durkee, LLP (57) ABSTRACT

A method is provided for use in a storage system, comprising: identifying a first process that is arranged to execute a first type-1 node and a first type-2 node of the storage system, the first type-1 node being assigned a communication link for transmitting replication data to a target system, the first type-2 node being arranged to execute I/O requests associated with a first set of addresses in an address space; identifying a second process that is arranged to execute a second type-1 node and a second type-2 node of the storage system, the second type-1 node being not being assigned any communication link for transmitting replication data to a target system, the second type-2 node being arranged to execute I/O requests associated with a second set of addresses in the address space; and transferring at least one of the addresses in the first set to the second set.

20 Claims, 9 Drawing Sheets

| | | | | 362 |
|---|---|---|---|---|
| 510A | LBA 0 – LBA 32 | 512 | C-NODE 1 | 514 |
| 510B | LBA 33 – LBA 66 | 512 | C-NODE 2 | 514 |
| 510C | LBA 67 – LBA 100 | 512 | C-NODE 3 | 514 |

FIG. 5

| | | | | 364 |
|---|---|---|---|---|
| 610A | R-NODE_402A | 612 | IP_LINK_ID_1 | 614 |
| 610B | R-NODE_402C | 612 | IP_LINK_ID_2 | 614 |

| | | 342 |
|---|---|---|
| 510A → | LBA 0 – LBA 32    512 | C-NODE 1    514 |
| 510B → | LBA 33 – LBA 66    512 | C-NODE 2    514 |
| 510C → | LBA 67 – LBA 100    512 | C-NODE 3    514 |

<BEFORE STEP 810 IS PERFORMED>

FIG. 9A

| | | 342 |
|---|---|---|
| 510A → | LBA 0 – LBA 15    512 | C-NODE 1    514 |
| 510B → | LBA 16 – LBA 66    512 | C-NODE 2    514 |
| 510C → | LBA 67 – LBA 100    512 | C-NODE 3    514 |

<AFTER STEP 810 IS PERFORMED>

PERFORMANCE OF REPLICATION SYSTEM WITH SMALL NUMBER OF IP LINKS AVAILABLE

BACKGROUND

A distributed storage system may include a plurality of storage devices (e.g., storage device arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: identifying a first process that is arranged to execute a first type-1 node and a first type-2 node of the storage system, the first type-1 node being assigned a communication link for transmitting replication data to a target system, the first type-2 node being arranged to execute I/O requests associated with a first set of addresses in an address space, and the first type-2 node being configured to transmit data replication requests to any of one or more type-1 nodes in the storage system that are assigned communication links for transmitting data to a replication system; identifying a second process that is arranged to execute a second type-1 node and a second type-2 node of the storage system, the second type-1 node being not being assigned any communication link for transmitting replication data to a target system, the second type-2 node being arranged to execute I/O requests associated with a second set of addresses in the address space, and the second type-2 node being configured to transmit data replication requests to any of the one or more type-1 nodes in the storage system that are assigned communication links for transmitting data to the replication system; and transferring at least one of the addresses in the first set to the second set, wherein transferring at least one of the addresses in the first set to the second set at least partially corrects for an imbalance between a first workload on the first process and a second workload on the second process, the imbalance resulting from the first type-1 node being the only one of the first type-1 node and the second type-1 node that is assigned a communication link for transmitting data to the replication system.

According to aspects of the disclosure, an apparatus is provided, comprising: a memory; and at least one processor operatively coupled to the memory, the at least one processor being configured to perform the operations of: identifying a first process that is arranged to execute a first type-1 node and a first type-2 node of the storage system, the first type-1 node being assigned a communication link for transmitting replication data to a target system, the first type-2 node being arranged to execute I/O requests associated with a first set of addresses in an address space, and the first type-2 node being configured to transmit data replication requests to any of one or more type-1 nodes in the storage system that are assigned communication links for transmitting data to a replication system; identifying a second process that is arranged to execute a second type-1 node and a second type-2 node of the storage system, the second type-1 node being not being assigned any communication link for transmitting replication data to a target system, the second type-2 node being arranged to execute I/O requests associated with a second set of addresses in the address space, and the second type-2 node being configured to transmit data replication requests to any of the one or more type-1 nodes in the storage system that are assigned communication links for transmitting data to the replication system; and transferring at least one of the addresses in the first set to the second set, wherein transferring at least one of the addresses in the first set to the second set at least partially corrects for an imbalance between a first workload on the first process and a second workload on the second process, the imbalance resulting from the first type-1 node being the only one of the first type-1 node and the second type-1 node that is assigned a communication link for transmitting data to the replication system.

According to aspects of the disclosure, a non-transitory computer-readable medium is provided that stores one or more processor-executable instructions, which when executed by at least one processor cause the at least one processor to perform the operations of: identifying a first process that is arranged to execute a first type-1 node and a first type-2 node of the storage system, the first type-1 node being assigned a communication link for transmitting replication data to a target system, the first type-2 node being arranged to execute I/O requests associated with a first set of addresses in an address space, and the first type-2 node being configured to transmit data replication requests to any of one or more type-1 nodes in the storage system that are assigned communication links for transmitting data to a replication system; identifying a second process that is arranged to execute a second type-1 node and a second type-2 node of the storage system, the second type-1 node being not being assigned any communication link for transmitting replication data to a target system, the second type-2 node being arranged to execute I/O requests associated with a second set of addresses in the address space, and the second type-2 node being configured to transmit data replication requests to any of the one or more type-1 nodes in the storage system that are assigned communication links for transmitting data to the replication system; and transferring at least one of the addresses in the first set to the second set, wherein transferring at least one of the addresses in the first set to the second set at least partially corrects for an imbalance between a first workload on the first process and a second workload on the second process, the imbalance resulting from the first type-1 node being the only one of the first type-1 node and the second type-1 node that is assigned a communication link for transmitting data to the replication system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
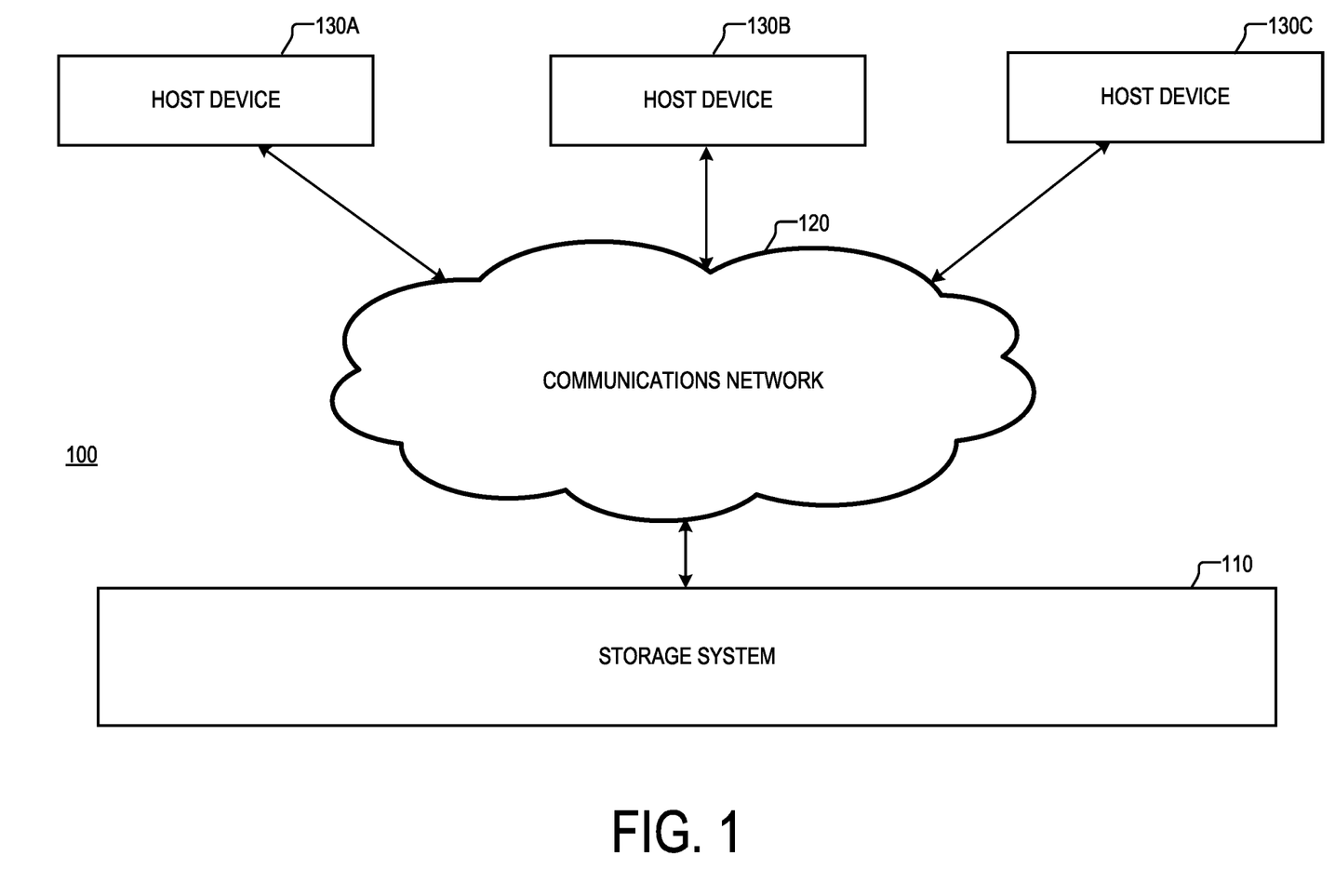
FIG. 1 is a diagram of an example of a system, according to aspects of the disclosure.

FIG. 1 is a diagram of an example of a system 100, according to aspects of the disclosure. The system 100 may include a storage system 110 that is coupled to one or more host devices 130 via a communications network 120. The storage system 110 may include a content-addressable storage system that is configured to retrieve and store data on one or more storage devices in response to I/O requests that are transmitted by the host devices 130. The communications network 120 may include a local area network (LAN), a wide area network (WAN), the Internet, and/or any other suitable type of communications network. Each of the host devices 130 may include a desktop computer, a laptop computer, a smartphone, a digital media player, and/or any other suitable type of electronic device.

Figure 2:
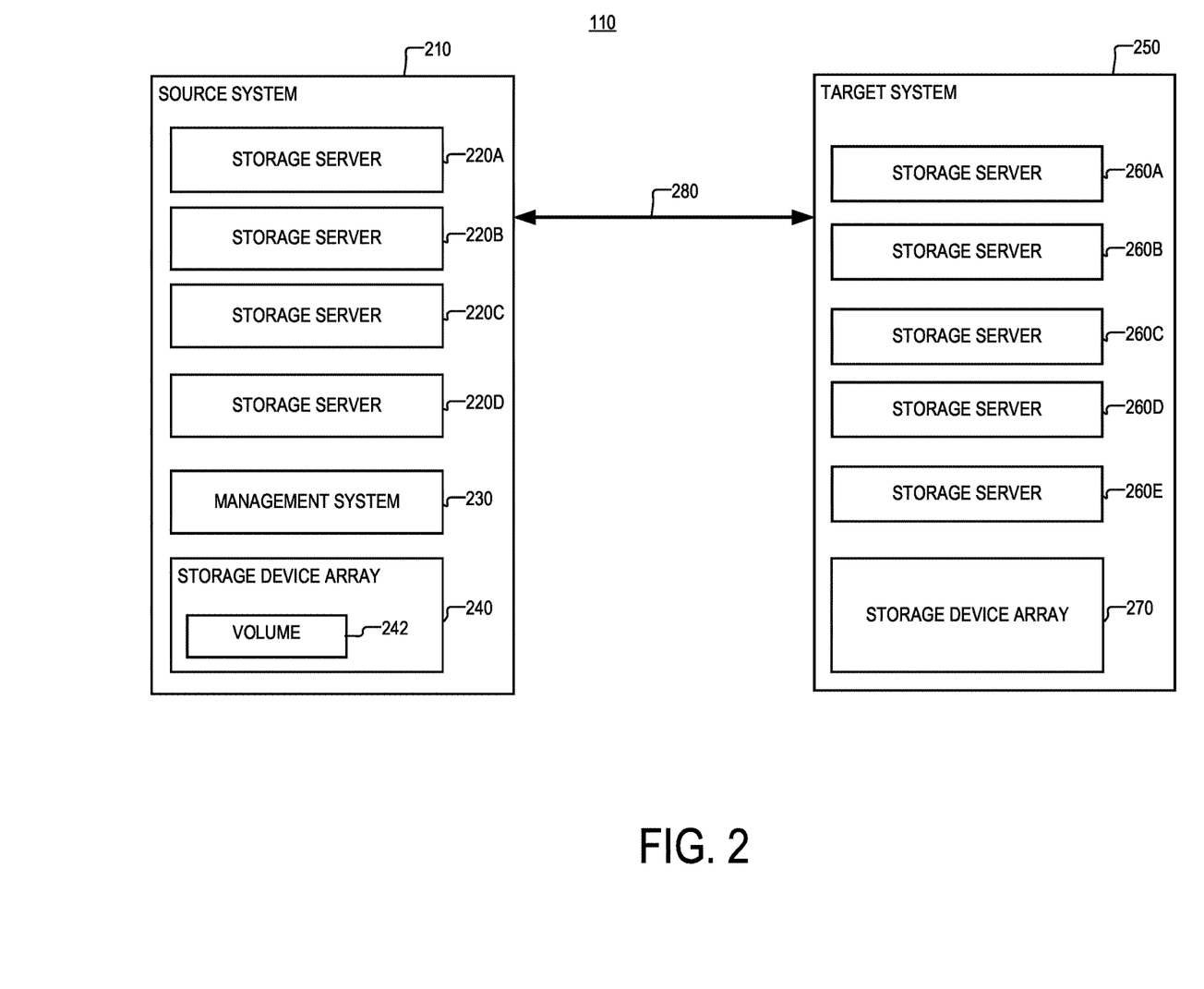
FIG. 2 is a diagram of an example of a storage system, according to aspects of the disclosure.

FIG. 2 is a diagram illustrating the storage system 110 in further detail, according to aspects of the disclosure. As illustrated, the storage system 110 may include a source system 210 that is coupled to a target system 250 via a network 280. The network 280 may include a TCP/IP network, and/or any other suitable type of communications network. The source system 210 may include a plurality of storage servers 220 (e.g., storage servers 220A-D) and a management system 230. In operation, each of the storage servers 220 may be configured to execute I/O requests that are received at the storage system 110. The I/O requests may include read requests, write requests, and/or any other suitable type of I/O request. The management system 230 may be arranged to: (i) assign various IP links for performing data replication to various R-nodes in the source system 210 (shown in FIG. 4) and adjust the load on operating system processes 412 (shown in FIG. 4) inside which the R-nodes are executed. The operation of the management system 230 is discussed further below with respect to FIGS. 3B-10.

The storage device array 240 may include a plurality of storage devices that are arranged in a redundant configuration. Any of the storage devices in the storage device array 240 may include a solid-state drive (SSD), a hard disk (HD), a non-volatile random-access memory (nvRAM) device, and/or any other suitable type of storage device. In some implementations, the storage device array 240 may include a Redundant Array of Independent Disks (RAID) array, and or any other suitable type of storage device array. In some implementations, the storage device array 240 may be configured to store the contents of a volume 242 and/or any other suitable type of storage object. In operation, the storage servers 220 may execute I/O requests that are received at the source system 210 from the host devices 130 by storing and/or retrieving data from the volume 242.

The target system 250 may include a plurality of storage servers 260 (e.g., storage servers 260A-E) and a storage device array 270, as shown. In some implementations, each of the storage servers 260 may be configured to execute data replication requests that are provided to the storage server 260 by any of the storage servers 220. The storage device array 270 may include a plurality of plurality of storage devices that are arranged in a redundant configuration. Any of the storage devices in the storage device array 270 may include a solid-state drive (SSD), a hard disk (HD), a non-volatile random-access memory (nvRAM) device, and/or any other suitable type of storage device. In some implementations, the storage device array 270 may include a Redundant Array of Independent Disks (RAID) array, and or any other suitable type of storage device array. In some implementations, the storage device array 270 may be configured to store replication data that is received, at the target system 250, from the source system 210.

The storage system 110 may be configured to perform synchronous and asynchronous data replication. Performing asynchronous replication by the storage system 110 (or source system 210) may include transmitting replication data from any of the storage servers 220 to any of the storage servers 260. The asynchronous snapshot data may be transmitted at fixed intervals, which are specified by a recovery point objective (RPO) of the storage system 110. The asynchronous replication data may be generated based on one or more I/O requests that are received at the storage system 110. The I/O requests may include a request to delete data stored in the storage system 110, a request to write data to the storage system 110, and/or any other suitable type of I/O request. In this regard, in some implementations, the asynchronous replication data may include a payload of the I/O requests (e.g., data that is desired to be stored in the storage system 110) and/or data that is generated based on the payload.

Performing synchronous replication by the storage system 110 (or source system 210) may include transmitting replication data from any of the storage servers 220 to any of the storage servers 260. The replication data may be associated with an I/O request that is received at the storage system 110. The I/O request may include a request to delete data stored in the storage system 110, a request to write data to the storage system 110 and/or any other suitable type of I/O request. In this regard, the synchronous replication data may be generated based on data that is associated with the I/O request. Moreover, in some implementations, the synchronous replication data may include a payload of the/O requests (e.g., data that is desired to be stored in the storage system 110) and/or data that is generated based on the payload.

It will be understood that the present disclosure is not limited to any specific method for synchronous and/or asynchronous replication. Examples concerning the generation of replication data are discussed in further detail in U.S. Pat. No. 10,310,951, titled Storage System Asynchronous Data Replication Cycle Trigger with Empty Cycle Detection, and U.S. Pat. No. 10,324,640, titled Storage System with Consistent Initiation of Data Replication Across Multiple Distributed Processing Modules, both of which are herein incorporated by reference in their entirety.

As is discussed further below, when an I/O request is received at the storage system 110, that request may be decomposed into sub-commands (e.g., C-node commands, D-node commands, etc.), which are then executed by different nodes of the storage system 110. The I/O request is completed only when all sub-commands associated with the I/O request are executed successfully. More specifically, as is further discussed below with respect to FIG. 4, the source system 210 may include a plurality of R-nodes (e.g., routing nodes), C-nodes (e.g., control nodes), and D-nodes (e.g., data nodes). In operation, when an I/O request is received at an R-node, that request may be decomposed into one or more C-node commands. Next, the C-node commands may be transmitted to respective C-nodes. Next, each of the C-node commands may be decomposed into one or more D-node commands by the C-nodes. Next, the D-node commands may be transmitted to respective D-nodes. And finally, each of the D-node commands may be executed by one of the D-nodes. Executing any of the D-node commands may include reading or writing data from the storage device array 240 and/or the volume 242.

Figure 3A:
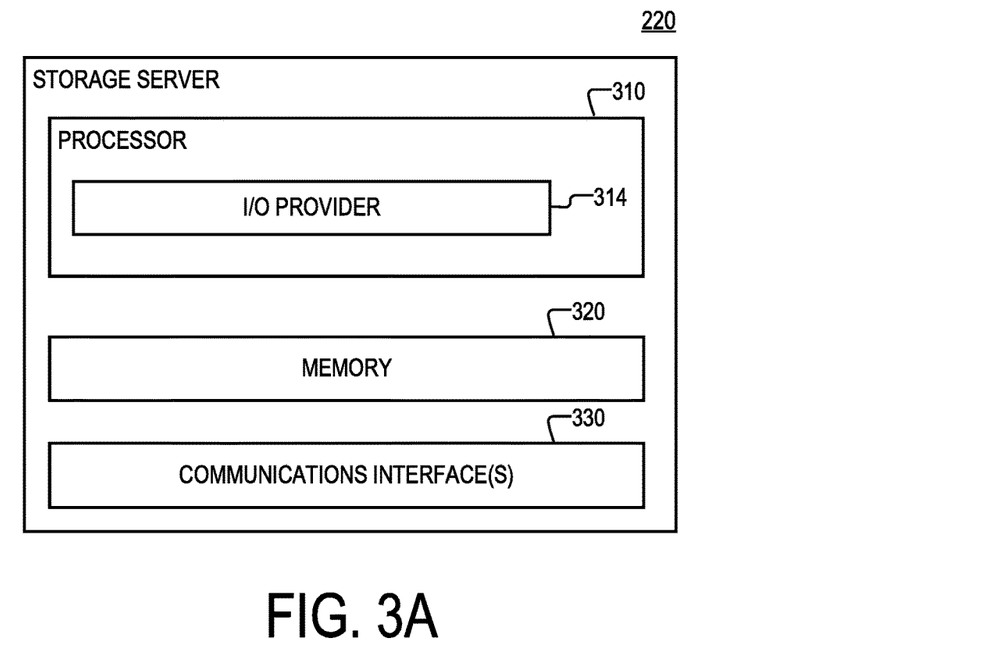
FIG. 3A is a diagram of an example of a storage server, according to aspects of the disclosure.

FIG. 3A is a diagram of an example of a storage server 220, according to aspects of the disclosure. As the numbering suggests, the storage server 220 may be the same or similar to any of the storage servers 220A-D, which are discussed above with respect to FIG. 2.

As illustrated, the storage server 220 may include a processor 310, a memory 320, a communications interface(s) 330. The processor 310 may include any of one or more general-purpose processors (e.g, x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example. According to the present example, the processor 310 may be configured to an I/O provider 314. The I/O provider 314 may include one or more processes for executing incoming I/O requests (e.g., write requests). The I/O provider 314 is discussed further below with respect to FIG. 4.

Figure 3B:
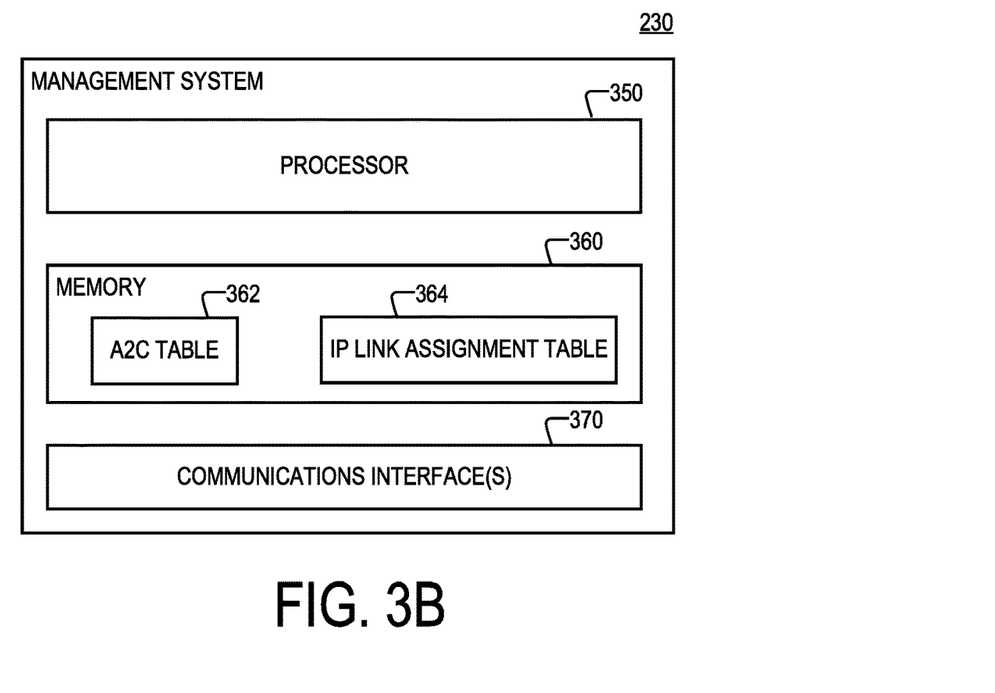
FIG. 3B is a diagram of an example of a management system, according to aspects of the disclosure.

FIG. 3B is a diagram of an example of the management system 230, according to aspects of the disclosure. As illustrated, the management system 230 may include a processor 350, a memory 360, a communications interface(s) 370. The processor 350 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 360 may include any suitable type of volatile and/or non-volatile memory. In some implementations, the memory 360 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 370 may include any suitable type of communications interface, such as one or more Ethernet adapters, one or more Wi-Fi adapters (e.g., 802.1414 adapters), and one or more Long-Term Evolution (LTE) adapters, for example.

In some implementations, the memory 360 may store an address-to-c-node (A2C) table 362. The A2C table 362 may identify a plurality of address ranges. Furthermore, the A2C table may map each of the plurality of address ranges to a different C-node in the storage system (e.g., see C-nodes 404 in FIG. 4). An example of the A2C table is discussed further below with respect to FIG. 6.

In some implementations, the memory 360 may store an IP link assignment table 364 (hereinafter "assignment table 364"). The assignment table 364 may identify a plurality of IP links for transmitting replication data from the source system 210 to the target system 250. Furthermore, the assignment table 364 may map each of the IP links to a different R-node of the source system 210. When an UP link is mapped to a given R-node, the IP link is said to be assigned to R-node. As is discussed further below, only nodes in the source system 210 that are assigned an IP link may transmit replication data to the target system 250 (i.e., via their assigned IP link) and/or service data replication requests that are transmitted by the C-nodes in the source system 210. Although the present example is provided in the context of IP links, it will be understood that any other suitable type of communication link can be used instead. As used throughout the disclosure, the term "communication link" may refer to any suitable type of virtual or non-virtual communication channel for transmitting data. In some implementations, a communication channel may be defined by a destination address and/or a destination port number for transmitting data. However, it will be understood that the present disclosure is not limited to any specific way of defining communication links, and/or IP links in particular. The assignment table 364 is provided as an example only. It will be understood that the present disclosure is not limited to using the assignment table 364 to track IP link assignments. Those of ordinary skill in the art will readily recognize, after reading this disclosure, that there can be a variety of ways to specify and/or identify mappings between IP links and respective R-nodes.

In some implementations, the management system 230 may provide a copy of the A2C table to each of the R-nodes in the source system 210. As is discussed further below with respect to FIG. 4, each of the R-nodes may use its respective copy of the A2C table to route respective C-node commands to respective C-nodes in the source system 210. Additionally or alternatively, in some implementations, the management system 230 may provide a copy of the assignment table 364 to each of the C-nodes in the source system 210. Each of the C-nodes may use its respective copy of the assignment table 364, at least in part, to select an R-node that is to receive data replication requests from that C-node.

It will be understood that the present disclosure is not limited to any specific implementations of the A2C table and the assignment table. For instance, the A2C table may include any suitable type of one or more data structures that are arranged to identify mappings between address ranges in an address space and corresponding C-nodes (or other type(s) of nodes). Similarly, the assignment table 364 may include any suitable type of one or more data structures that are arranged to identifying mappings between R-nodes (and/or other type(s) of nodes) and corresponding communication links. Furthermore, it will be understood that the present disclosure is not limited to any specific way of providing a copy of the A2C table to each of the R-nodes in the source system 210. For example, in some implementations, a different respective copy may be provided to each of the R-nodes in the storage system. Additionally or alternatively, in some implementations, respective copies of the A2C table 362 may be provided to different groups of R-nodes, and the R-nodes in each group may share the same copy.

Figure 4:
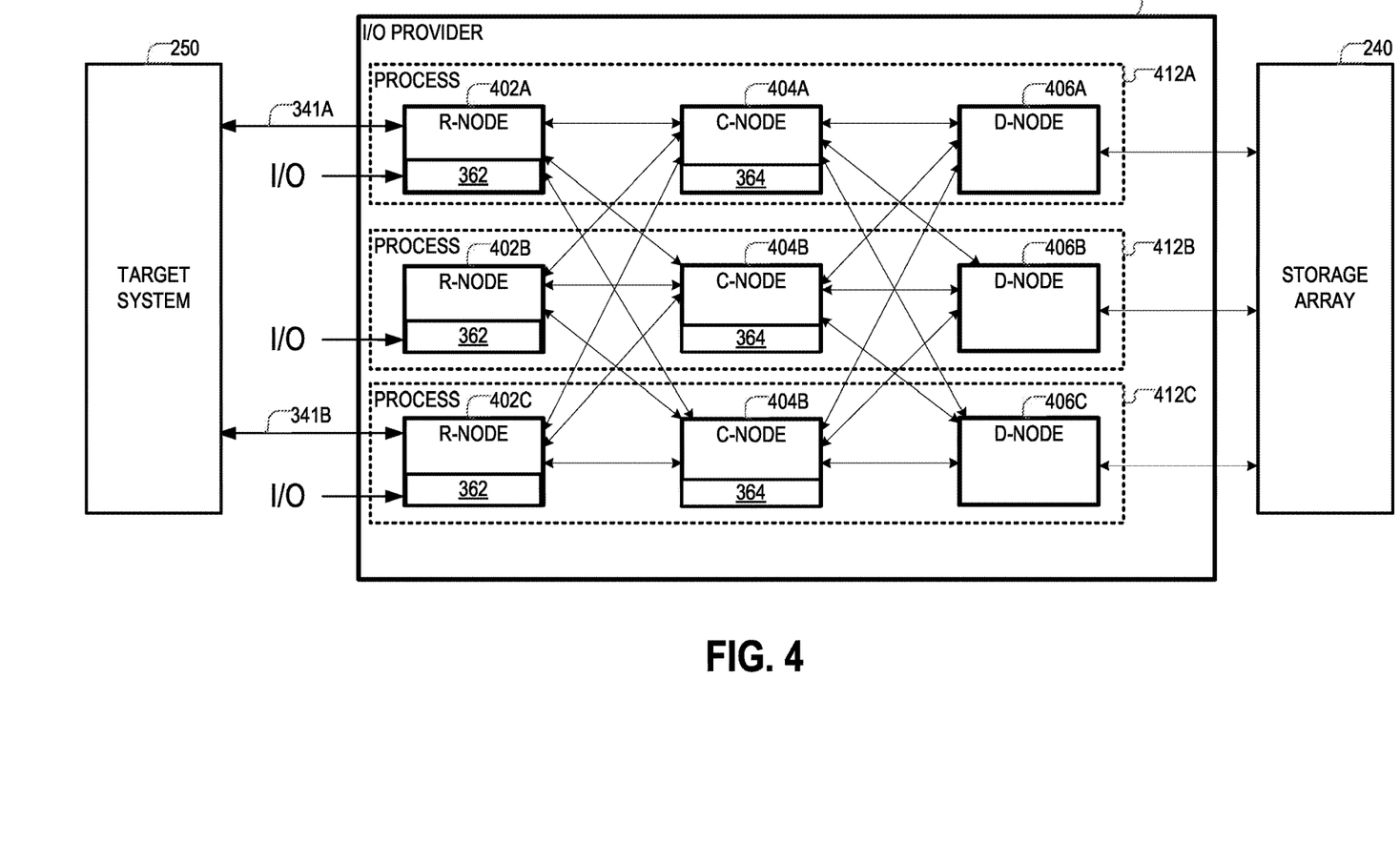
FIG. 4 is a diagram of an example of an I/O provider, according to aspects of the disclosure.

FIG. 4 is a diagram illustrating an example of one implementation of the I/O provider 314. According to the present example, the I/O provider 314 includes nodes 402, 404, and 406, which are herein referred to as routing nodes (R-nodes), control nodes (C-nodes), and data nodes (D-nodes) respectively. The R-nodes, the C-nodes, and the D-nodes are connected to one another in a mesh network. The C-nodes, R-nodes, and D-nodes may be executed in (e.g., instantiated within the memory space of) corresponding operating system processes 412. Specifically, R-node 402A, C-node 404A, and D-node 406A may be executed as separate threads that are instantiated within an process 412A; R-node 402B, C-node 404B, and D-node 406B may be executed as separate threads that are instantiated within a process 412B; and R-node 402C, C-node 404C, and D-node 406C may be executed as separate threads that are instantiated within an operating system process 412C. As used throughout the disclosure, the term process may refer to any set of processor-executable instructions which are scheduled together by a scheduler. As used throughout the disclosure, the term thread may refer to any set of processor-executable instructions which are scheduled together by a scheduler. For the purposes of describing the ideas and concepts of the present disclosure, the terms "process" and "thread" are used interchangeably. Although in the present example, the R-nodes 402, the C-nodes 404, and the D-nodes 406 are executed within respective operating system processes, it will be understood that alternative implementations are possible in which the R-nodes 402, the C-nodes 404, and the D-nodes 406 are executed within another type of process or thread.

Figure 5:
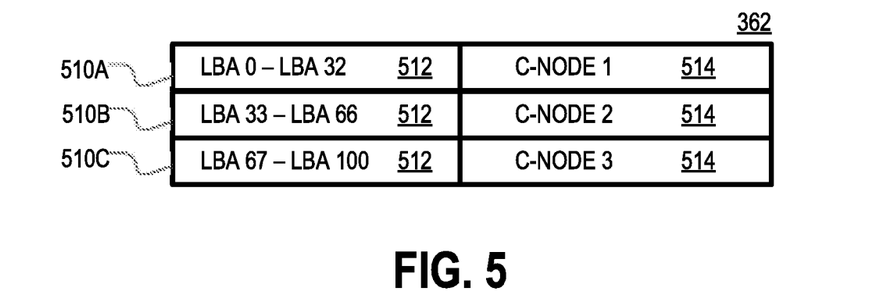
FIG. 5 is a diagram of an example of an A2C table, according to aspects of the disclosure.

FIG. 5 shows an example of the A2C table. As illustrated, the A2C table 362 may include a plurality of entries 510. Each of the entries 510 may correspond to a different one of the C-nodes 404. Each of the entries 510 may include a field 512 and a field 514. The field 514 in each of the entries 510 may store an identifier of a different one of the C-nodes 404. The field 512 in each of the entries 510 may include an address set definition that identifies one or more addresses in the address space of the volume 242 that are serviced by the entry's respective C-node 402. According to the example of FIG. 5, the entry 510A indicates that C-node 404A is responsible for handling C-node commands associated with addresses 0 through 32 in the address space of the volume 342; the entry 510B indicates that C-node 404B is responsible for handling C-node commands associated with addresses 33 through 66 in the address space of the volume 342; and the entry 510C indicates that C-node 404C is responsible for handling C-node commands associated with addresses 67 through 100 in the address space of the volume 342. As can be readily appreciated, FIG. 5 is provided for illustrative purposes only. Although FIG. 5 indicates that the entire address space of the volume 342 includes only 100 addresses, those of ordinary skill in the art will readily recognize that in practice the address space of the volume 342 may have a much larger number of addresses. Furthermore, although FIG. 5 indicates that each of the C-nodes 404 is mapped to a contiguous set of addresses, it will be understood that in some implementations one or more of the C-nodes 404 may be mapped to a non-contiguous set of addresses. And still furthermore, it will be understood that the A2C table 362 may also provide address assignments for C-nodes that are executed on other (e.g., all or at least some) storage servers 220 in the source system 210. FIG. 5 is provided for illustrative purposes only. Although in the example of FIG. 5 the A2C table 362 is depicted as mapping only addresses in the address space of the volume 242, in some implementations the A2C table 362 may map addresses from the entire logical space of the storage system 110. Stated succinctly, it will be understood that the present disclosure is not limited to any specific type of address space being mapped by the A2C table 362.

Figure 6:
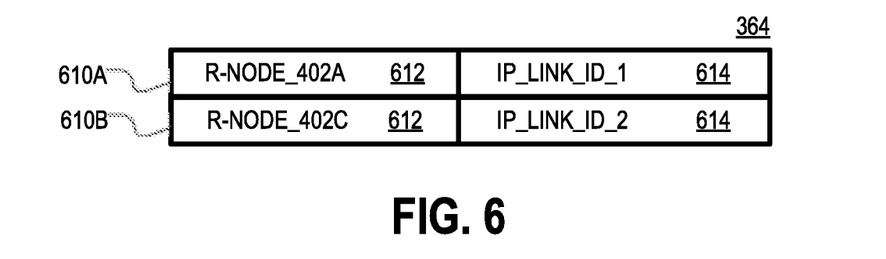
FIG. 6 is a diagram of an IP link assignment table, according to aspects of the disclosure.

FIG. 6 shows an example of the assignment table 364. As illustrated, the assignment table may include a plurality of entries 610. Each of the entries 610 may be associated with a different one of the R-nodes 402. Each of the entries 610 may include a respective field 612 and a respective field 614. The respective field 612 in each of the entries 610 may include an R-node identifier, and the respective field 614 in each of the entries may include an identifier of an IP link 341 that has been assigned to the entry's 610 respective R-node 402. The IP link identifier may include one or more of a port number, an IP address, and/or any other suitable identifier that identifies (e.g., uniquely identifies) a channel for transmission of replication data between an R-node 402 and any nodes in the target system 250.

As noted above, the assignment table 364 identifies IP links for transmitting replication data to the target system 250 that have been assigned to different R-nodes. According to the Example of FIG. 4, R-node 402A is assigned an IP link 341A for transmitting replication data to the target system 250 and R-node 402C is assigned an IP link 341B for transmitting data to the target system 250. The assignment of IP link 341A to R-node 402A is defined by entry 610A of the assignment table 364. And the assignment of IP link 341B to the R-node 402C is defined by entry 610B. According to the present example, the R-node 402B is not assigned an IP link for transmitting data to the target system 250. Although in the in the example of FIG. 6, the assignment table 364 identifies IP link assignments for R-nodes that are executed on one storage server 220, those of ordinary skill in the art will recognize that the assignment table 364 may also IP link assignments for R-nodes that are executed on other (e.g., all or at least some) storage servers 220 in the source system 210.

Returning to FIG. 4, the R-nodes 402 may be configured to terminate I/O requests received at the storage system 110 and route them to appropriate C-nodes 404 and D-nodes 406 for further execution. In doing so, the R-nodes 402 may distribute a workload over multiple C-nodes 404 and D-nodes 406. In some implementations, any of the R-nodes 402 may be configured to write I/O requests (e.g., SCSI I/O requests) to selected ones of the C-nodes 404 for further processing. Furthermore, as noted above, each of the R-nodes 402 may be configured to store (or at least access) a copy of the A2C table 362.

The C-nodes 404 may be configured to control the execution of C-node commands supplied by the R-nodes 402. The C-node commands may be used to implement read requests, write requests, and/or any other suitable type of I/O request. In addition, each of the C-nodes 404 may maintain and manage key metadata elements. Each of the C-nodes 404 may be configured to receive C-node commands from the R-nodes and communicate with the D-nodes 406 to execute the commands. Furthermore, as noted above, each of the C-nodes 404 may be configured to store (or at least access) a copy of the assignment table 364.

The D-nodes 406 may be configured to control the execution of D-node commands supplied by the C-nodes 404 by reading and/or writing data to the storage device array 240. Each of the D-nodes 406 may be configured to map hash digests received from the C-nodes (in respective D-node commands) to different physical locations in the storage device array 240. In some implementations, the mapping may be performed by using a hash-to-physical address (H2P) structure (not shown) that is stored in the memory of any of the D-nodes 406.

In operation, any of the R-nodes 402 may receive an I/O request to store data in the storage device array that spans a range of logical data addresses (LDAs) from a multipath agent. The request may include a block of data and an opcode identifying an action that is required to be performed. In response to the request, the R-node 402 may identify one or more of C-nodes 404 by using its respective copy of the A2C table 362. Afterwards, the R-node 402 may decompose the I/O request into a plurality of C-node commands and forward the C-node commands to the identified C-nodes 404 for further processing. For instance, if the I/O request is associated with addresses 23-43 in the volume 242, the R-node 402 may: (i) detect based on the A2C table that the C-node 402a is assigned to service addresses 0-32 in the volume 242, (ii) detect based on the A2C table that the C-node 404b is assigned to service addresses 33-66 in the volume 242, (iii) generate one or more C-node commands associated with addresses 23-32 in the volume 242 and forward the generated C-node commands to the C-node 404A, (iv) generate one or more C-node commands associated with addresses 33-43 in the volume 242 and forward the generated C-node commands to the C-node 404B.

In operation, any of the C-nodes 404 may receive a C-node command that is generated by one of the R-nodes 402. The C-node command may include a data payload and an opcode identifying an action that is required to be performed. Upon receiving the C-node command, the C-node 404 may generate one or more D-node commands and supply the generated D-node commands to corresponding D-nodes 406 for further processing.

In operation, any of the D-nodes 406 may receive a D-node command that is generated by one of the C-nodes 404. Next, the D-node 406 may identify a physical address in the storage device array 240 that corresponds to a hash digest that is contained in the D-node command. Afterwards, the D-node 406 may store the payload of the D-node command (i.e., a page of data contained in the D-node command) at the identified physical address.

In some implementations, any of the C-nodes 404 may also be responsible for performing data replication (e.g., synchronous replication and asynchronous replication). In such implementations, when a C-node command is received at a C-node 404, the C-node 404 may generate a first data replication request associated with the C-node command. Then, the C-node may search the assignment table 364 and select one of the R-nodes 402 that have been assigned IP links for transmitting replication data to the target system 250. And finally, the C-node forward the first data replication request to the selected one of the R-nodes 402. The R-node 402 may then forward the replication request to the target system 250. For example, a C-node command is received at the C-node 404B from the R-node 402B, the C-node 404B may: (i) perform a search of the assignment table 364 to detect that the R-nodes 402A and 404C have been assigned IP link 341 for transmitting replication data to the target system 250, (ii) select one of the identified R-nodes (i.e., select one of R-nodes 402A and 402C) (iii) generate a data replication request that is associated with the received C-node command, and (iv) transmit the data replication request to the selected R-node. Forwarding the first data replication request to the target system 250 may include either: (i) transmitting the first data replication request to the target system 250, or (ii) generating a second data replication request based on the first data replication request, and transmitting the data replication request to a node in the replication system. It will be understood that the present disclosure is not limited to any specific method for handling (and/or executing) data replication requests that are received at the R-nodes 402 from the C-nodes 404.

In some implementations, fewer than all R-nodes 402 in the source system 210 may be assigned IP links 341 for transmitting data to the target system 250. Additionally or alternatively, in some implementations, any of the C-nodes 404 may transmit data replication requests only to R-nodes that have been assigned IP links for transmitting replication data to the target system 250. Accordingly, R-nodes that have not been assigned IP links for transmitting replication data to the target system 250 may not receive such data replication requests, and they would experience a lower work load than R-nodes that have been assigned IP links for transmitting replication data to the target system 250. In other words, the assignment of respective IP links 341 to fewer than all R-nodes in the source system 210 may result in a load imbalance between the R-nodes in the source system 210 and thus, a load imbalance between the processes 412 that host the R-nodes.

According to aspects of the disclosure, the management system 230 is configured to correct for any load imbalance between the processes 412 that results from fewer than all R-nodes 402 being assigned IP links 341 for transmitting data to the target system 250. The correction is performed by: (i) reducing the load on C-nodes 404 in processes 412 where the R-nodes 402 have to perform comparatively more work as a result being assigned IP links for transmitting replication data to the target system 250, (ii) increasing the load on C-nodes 404 in processes 412 where the R-nodes 402 have to perform comparatively less work as a result of not being assigned IP links for transmitting replication data to the target system 250. More particularly, if in a given process 412 the R-node 402 is assigned an IP link for transmitting replication data to the target system 250, the load on the C-node in the same process 412 may be reduced. By contrast, if in a given process 412 the R-node 402 is not assigned an IP link for transmitting replication data to the target system 250, the load on the C-node in the same process 412 may be increased.

In some implementations, reducing the load on a first C-node 404 may include shrinking a first set of addresses (in the address space of the volume 342) that is handled by the first C-node 404. Furthermore, in some implementations, increasing the load on a second C-node 404 may include enlarging a second set of address (in the address space of the volume 342) that is handled by the second C-node 404. In some implementations, reducing the load on one C-node 404 and increasing the load on another C-node 404 may be performed by transferring one or more addresses from a first set of addresses that is handled by the C-node to a second set of addresses that is handled by a second C-node. As can be readily appreciated, the transfer of one or more addresses may be accomplished by modifying the A2C table 362 accordingly.

Figure 7:
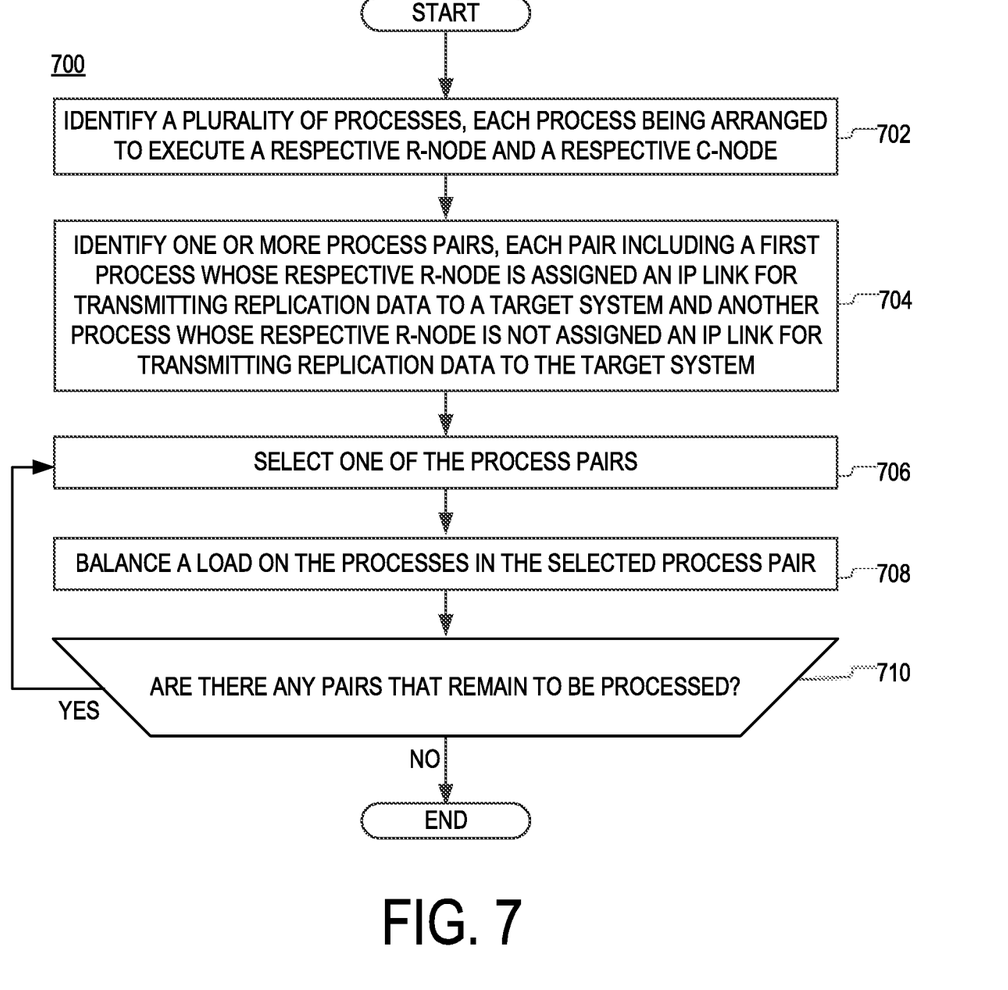
FIG. 7 is a flowchart of an example of a method, according to aspects of the disclosure.

FIG. 7 is a flowchart of a method 700 for balancing the load on processes in the source system 210 that are used to service I/O requests. According to the example of FIG. 7, the method 700 is executed by the management system 230.

At step 702, the management system 230 identifies a plurality of processes 412 in the source system 210. As discussed above, each process 412 may include at least a respective C-node and a respective R-node. According the present example, the plurality of processes 412 includes processes 412A-C as well as any other process 412 that is executed on any of the storage servers 220 of the source system 210.

At step 704, the management system 230 identifies one or more process pairs. Each of the process pairs includes: (i) a first process 412 whose respective R-node is assigned an IP link for transmitting data to the target system 250, and (ii) a second process 412 whose respective R-node is not assigned any IP links for transmitting replication data to the target system 250. According to the present example, the one or more identified pairs includes a pair including the process 412A and the process 412B.

At step 706, the management system 230 selects one of the process pairs (identified at step 704), which has not been selected before during the current execution of the method 700.

At step 708, the management system 230 balances the respective loads on the first process and the second process in the selected process pair. The manner in which step 708 is performed is discussed further below with respect to FIG. 8.

At step 710, the management system 230 determines whether all of the process pairs (identified at step 704) have been selected during the current execution of the method 700. If there are process pairs that remain to be selected, the method 700 returns to step 706. Otherwise, if each of the pairs (identified at step 704) has been selected during the current execution of the method 700, the method 700 ends. As can be readily appreciated, each of the pairs (identified at step 704) can be selected only once (at step 706) during the execution of the process 700.

Figure 8:
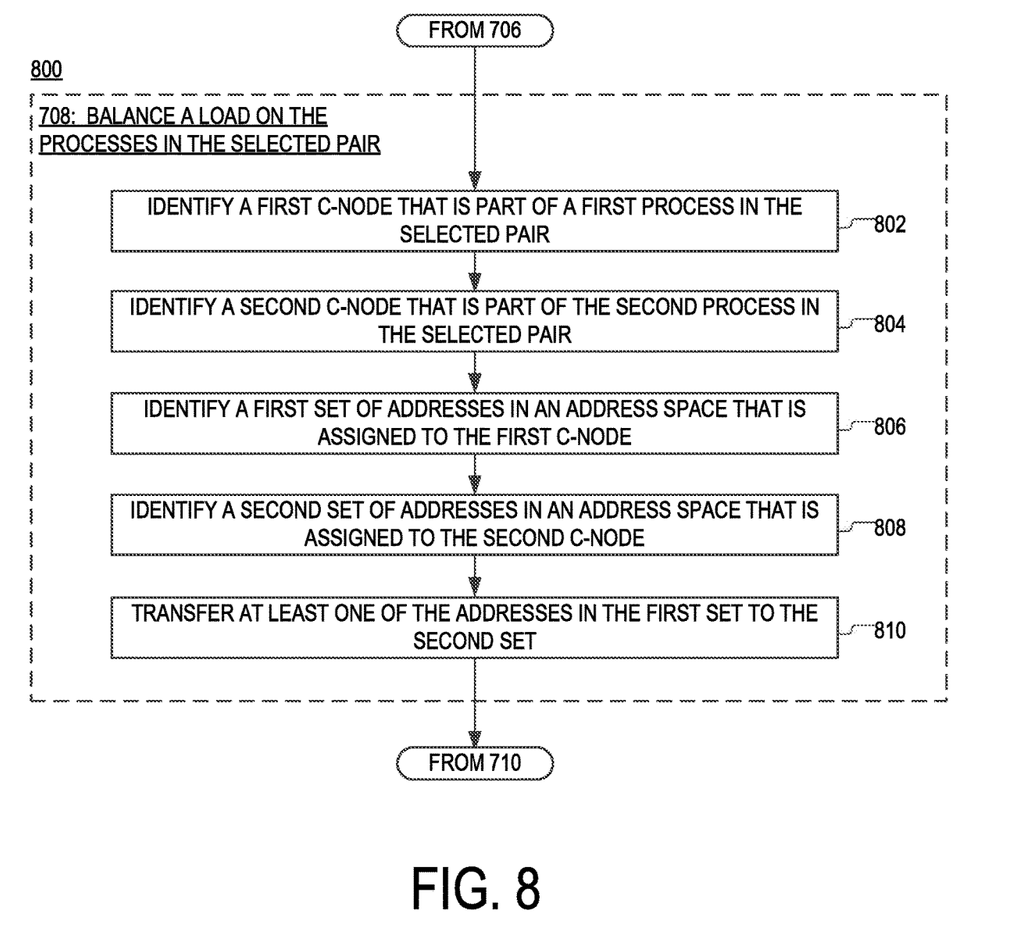
FIG. 8 is a flowchart of an example of a method, according to aspects of the disclosure.

FIG. 8 is a flowchart of an example of a method 800 for balancing a load on the processes in a process pair as specified by step 708 of the method 800. The method 800 is presented in the context of a process pair including the process 412A and the process 412B, both of which are discussed above with respect to FIG. 4. However, it will be understood that the method 800 can be used to balance the processes of any of the process pairs that are identified at step 704 of the method 800.

At step 802, a first C-node is selected that is part of the first process in the process pair. According to the present example, the C-node 404A is selected.

At step 804, a second C-node is selected that is part of the first process in the process pair. According to the present example, the C-node 404B is selected.

At step 806, the management system 230 identifies a first set of addresses in an address space of the volume 242 that is serviced by the first C-node (i.e., the C-node 404A). In some implementations, the management system 230 may identify the first set of addresses by searching one or more data structures, such as the A2C table 362. According to the present example, the first set of addresses includes addresses 0-32 in the volume 242.

At step 808, the management system 230 identifies a second set of addresses in an address space of the volume 242 (and/or the entire logical address space of the storage system 110, etc.) that is serviced by the second C-node (i.e., the C-node 404B). In some implementations, the management system 230 may identify the second set of addresses by searching one or more data structures, such as the A2C table 362. According to the present example, the second set of addresses includes addresses 33-66 in the volume 242.

At step 810, the management system 230 transfers one or more of the addresses in the first set to the second set. As is discussed further below with respect to FIGS. 9A-B, transferring the one or more addresses from the first set to the second set may include changing the address assignments (e.g., address set definitions) in the A2C table 362.

Figure 9A:
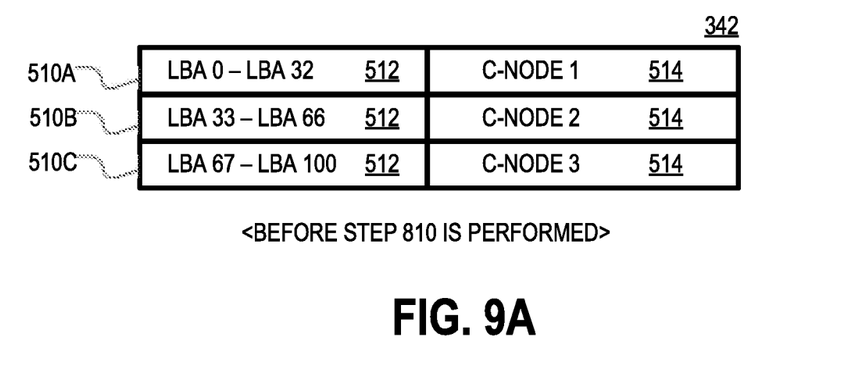
FIG. 9A is a diagram illustrating the state of the A2C table of FIG. 5 before a step in the method of FIG. 8 is executed according to aspects of the disclosure.
Figure 9B:
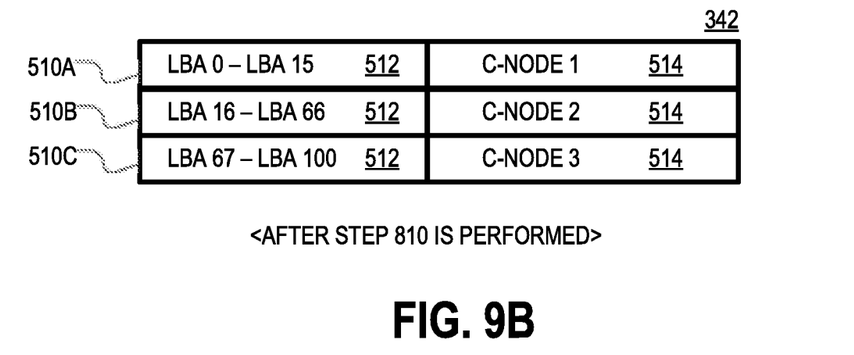
FIG. 9B is a diagram illustrating the state of the A2C table of FIG. 5 after the step in the method of FIG. 8 is executed according to aspects of the disclosure.

FIGS. 9A-B is a diagram illustrating the performance of step 810, according to aspects of the disclosure. Shown in FIG. 9A is the A2C table before step 810 is performed. As illustrated, before step 810 is performed, C-node 404A is assigned addresses 0-32 in the volume 242; C-node 404B is assigned addresses 33-66 in the volume 242, and C-node 404C is assigned addresses 67-100. FIG. 9B shows the state of the A2C table 362 after step 810 is performed. As illustrated, performing step 810 includes: (i) modifying the entry 510A of the A2C table 362 (e.g., by the management system 230) to indicate that C-node 404A is now responsible for addresses 0-15 in the address space of the volume 342, and (ii) modifying the entry 510B (e.g., by the management system 230) to indicate that the C-node 404B is now responsible for address 16-66 in the address space of the volume 242. In some implementations, when performing step 810, the management system 230 may first change the copy of the A2C table 362 that is kept in the memory of the management system 230, after which the management system 230 may transmit an instruction to any of the storage servers 220 instructing the storage server 220 to make the same change to any copies of the A2C table 362 that are stored in the memory of that storage server.

Figure 10:
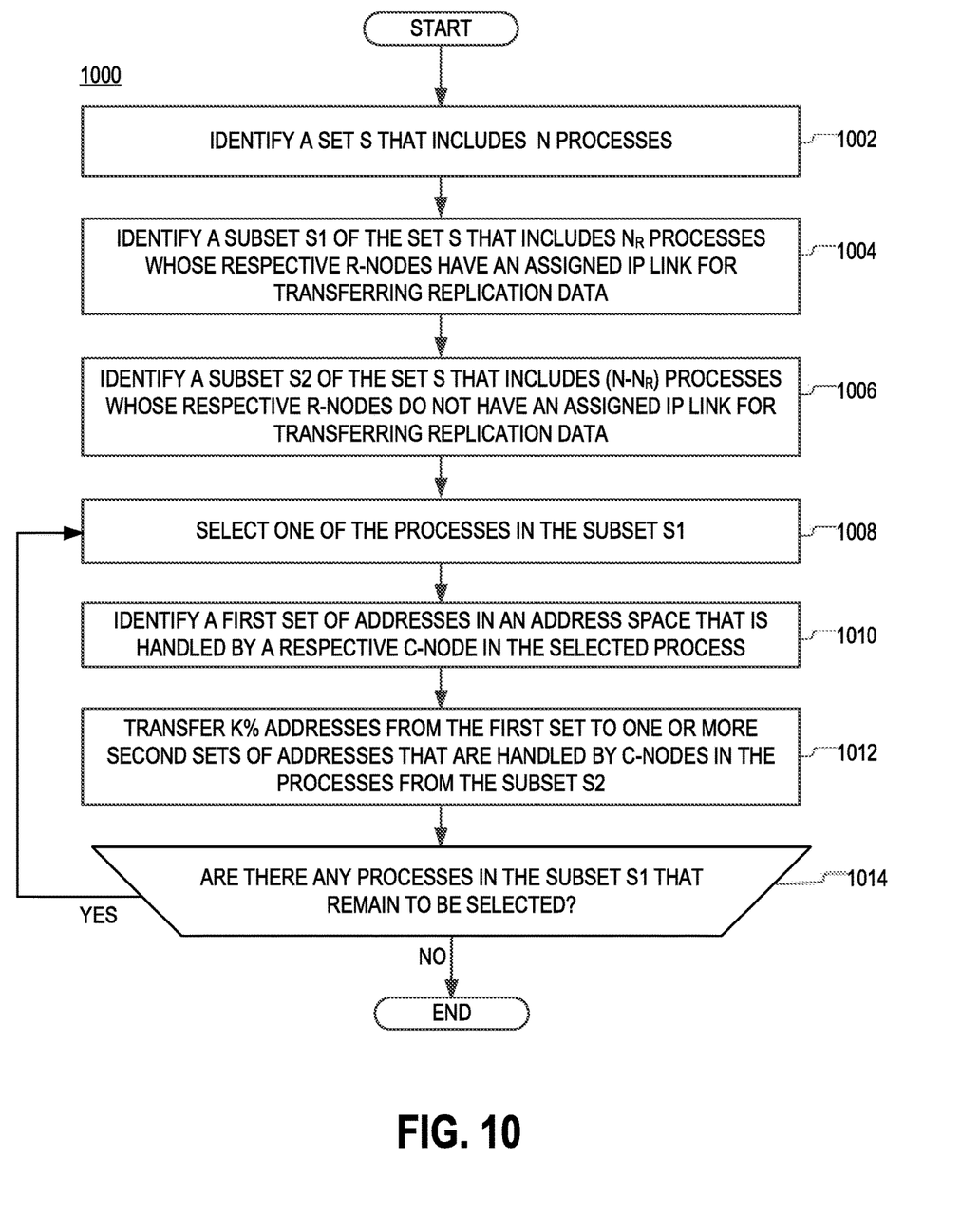
FIG. 10 is a flowchart of an example of a method, according to aspects of the disclosure.

FIG. 10 is a flowchart of an example of a method 1000 for balancing the load on processes 412 that are executed in the source system 210, according to aspects of the disclosure.

At step 1002, the management system 230 identifies a set S of processes 412 that are executed on one or more of the storage servers 220 of the source system 210. According to the present example, the set includes N processes 412, wherein N is a positive integer greater than or equal to 1.

At step 1004, the management system 230 identifies a subset S1 of the set S, wherein each process 412 in the subset S1 includes an R-node 402 that is assigned an link for transmitting replication data to the target system 250. According to the present example, the subset S1 includes $N_R$ processes 412, wherein $N_R$ is a positive integer less than or equal to N.

At step 1006, the management system 230 identifies a subset S2 of the set S, wherein none of the processes 412 in the subset S2 includes an R-node 402 that is assigned an IP link for transmitting replication data to the target system 250. According to the present example, the subset S2 includes $(N-N_R)$ processes 412.

At step 1008, the management system 230 selects one of the processes 412 in the subset S1. According to the present example, the selected process 412 is a process that has not been selected before during a previous iteration of steps 1008-1018. In other words, during the current execution of the method 1000, each of the processes 412 in the subset S1 may be selected only once.

At step 1010, the management system 230 identifies a first set of addresses in the address space of the volume 342 (and/or the entire logical address space of the storage system 110, etc.) that is handled by a respective C-node 404, which is part of the selected process 412 (i.e., the process selected at step 1008). In some implementations, the first set of addresses may be identified by performing a search of the A2C table 362. Additionally or alternatively, in some implementations, step 1012 may be performed in the same or similar manner to step 806 of the method 800. However, it will be understood that the present disclosure is not limited to any specific method for identifying the first set of addresses.

At step 1012, the management system 230 transfers K % of the addresses in the first set (identified at step 1010) to one or more second sets of addresses in the address space of the volume 342 (and/or the entire logical address space of the storage system 110, etc.). Each of the second address sets may include one that is handled by a different one of the C-nodes 404 that are executed in the processes 412 from the second subset S2. In some implementations, K % of the address in the first set may be distributed substantially equally among the C-nodes in the second subset S2 (i.e. C-nodes that are part of processes from the subset S2). In some implementations, the transfer may be performed by modifying the A2C table 342 as discussed above with respect to FIGS. 8-9B. In some implementations, the value of K can be determined according to equation 1 below.

$$K = \left(1 - \frac{N_R}{N}\right) * 100 \quad \text{(Eq. 1)}$$

At step 1014, the management system 230 determines whether there are any processes 412 in the first subset S1 that remain to be selected. If there are processes 412 in the subset S1 that remain to be selected the method 1000 returns to step 1008. Otherwise, the method 1000 ends. In some implementations, steps 1008-1014 may be performed for each of the processes in the subset S1.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

As used throughout the disclosure, the term "storage system" may refer to one or more of: (i) a distributed storage system including a source system and a target system, (ii) the target system, or (iii) the source system.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
identifying a first process that is arranged to execute a first type-1 node and a first type-2 node of the storage system, the first type-1 node being assigned a communication link for transmitting replication data to a target system, the first type-2 node being arranged to execute I/O requests associated with a first set of addresses in an address space, and the first type-2 node being configured to transmit data replication requests to any of one or more type-1 nodes in the storage system that are assigned communication links for transmitting data to a replication system;
identifying a second process that is arranged to execute a second type-1 node and a second type-2 node of the storage system, the second type-1 node being not assigned any communication link for transmitting replication data to a target system, the second type-2 node being arranged to execute I/O requests associated with a second set of addresses in the address space, and the second type-2 node being configured to transmit data replication requests to any of the one or more type-1 nodes in the storage system that are assigned communication links for transmitting data to the replication system; and
transferring at least one of the addresses in the first set to the second set, wherein transferring at least one of the addresses in the first set to the second set at least partially corrects for an imbalance between a first workload on the first process and a second workload on the second process, the imbalance resulting from first type-1 node being the only one of the first type-1 node and the second type-1 node that is assigned a communication link for transmitting data to the replication system.

2. The method of claim 1, wherein the first type-1 node and the first type-2 node include respective threads that are instantiated within the first processes, and the second type-1 node and the second type-2 node include respective threads that are instantiated within the second process.

3. The method of claim 1, wherein:
the first type-1 node is configured to: (i) provide to the first type-2 node any incoming I/O requests that are associated with an address from the first set; and (ii) provide to the second type-2 node any incoming I/O requests that are associated with an address from the second set, and
the second type-1 node is configured to: (i) provide to the first type-2 node any incoming I/O requests that are associated with an address from the first set; and (ii) provide to the second type-2 node any incoming I/O requests that are associated with an address from the second set.

4. The method of claim 1, wherein the first type-1 node includes a first R-node node, the first type-2 node includes a first C-node, the second type-1 node includes a second R-node, and the second type-2 node includes a second C-node.

5. The method of claim 1, wherein the first process includes a first operating system process and the second process includes a second operating system process.

6. The method of claim 1, further comprising, storing in a memory, a data structure that: (i) maps a first definition of the first set to the first type-2 node and (ii) maps a second definition of the second set to the second type-2 node, wherein transferring the at least one of the addresses in the first set to the second set includes removing the address from the first definition and adding the address to the second definition.

7. The method of claim 6, wherein the data structure includes an address-to-C-node (A2C) table.

8. An apparatus, comprising:
a memory; and
at least one processor operatively coupled to the memory, the at least one processor being configured to perform the operations of:
identifying a first process that is arranged to execute a first type-1 node and a first type-2 node of the storage system, the first type-1 node being assigned a communication link for transmitting replication data to a target system, the first type-2 node being arranged to execute I/O requests associated with a first set of addresses in an address space, and the first type-2 node being configured to transmit data replication requests to any of one or more type-1 nodes in the storage system that are assigned communication links for transmitting data to a replication system;
identifying a second process that is arranged to execute a second type-1 node and a second type-2 node of the storage system, the second type-1 node being not being assigned any communication link for transmitting replication data to a target system, the second type-2 node being arranged to execute I/O requests associated with a second set of addresses in the address space, and the second type-2 node being configured to transmit data replication requests to any of the one or more type-1 nodes in the storage system that are assigned communication links for transmitting data to the replication system; and
transferring at least one of the addresses in the first set to the second set, wherein transferring at least one of the addresses in the first set to the second set at least partially corrects for an imbalance between a first workload on the first process and a second workload on the second process, the imbalance resulting from the first type-1 node being the only one of the first type-1 node and the second type-1 node that is assigned a communication link for transmitting data to the replication system.

9. The apparatus of claim 8, wherein the first type-1 node and the first type-2 node include respective threads that are instantiated within the first processes, and the second type-1 node and the second type-2 node include respective threads that are instantiated within the second process.

10. The apparatus of claim 8, wherein:
the first type-1 node is configured to: (i) provide to the first type-2 node any incoming I/O requests that are associated with an address from the first set; and (ii) provide to the second type-2 node any incoming I/O requests that are associated with an address from the second set, and
the second type-1 node is configured to: (i) provide to the first type-2 node any incoming I/O requests that are associated with an address from the first set; and (ii) provide to the second type-2 node any incoming I/O requests that are associated with an address from the second set.

11. The apparatus of claim 8, wherein the first type-1 node includes a first R-node node, the first type-2 node includes a first C-node, the second type-1 node includes a second R-node, and the second type-2 node includes a second C-node.

12. The apparatus of claim 8, wherein the first process includes a first operating system process and the second process includes a second operating system process.

13. The apparatus of claim 8, wherein:
the memory is configured to store a data structure that: (i) maps a first definition of the first set to the first type-2 node and (ii) maps a second definition of the second set to the second type-2 node, and
transferring the at least one of the addresses in the first set to the second set includes removing the address from the first definition and adding the address to the second definition.

14. The apparatus of claim 13, wherein the data structure includes an address-to-type-2 node (A2C) table.

15. A non-transitory computer-readable medium storing one or more processor-executable instructions, which when executed by at least one processor cause the at least one processor to perform the operations of:
identifying a first process that is arranged to execute a first type-1 node and a first type-2 node of the storage system, the first type-1 node being assigned a communication link for transmitting replication data to a target system, the first type-2 node being arranged to execute I/O requests associated with a first set of addresses in an address space, and the first type-2 node being configured to transmit data replication requests to any of one or more type-1 nodes in the storage system that are assigned communication links for transmitting data to a replication system;
identifying a second process that is arranged to execute a second type-1 node and a second type-2 node of the storage system, the second type-1 node being not being assigned any communication link for transmitting replication data to a target system, the second type-2 node being arranged to execute I/O requests associated with a second set of addresses in the address space, and the second type-2 node being configured to transmit data replication requests to any of the one or more type-1 nodes in the storage system that are assigned communication links for transmitting data to the replication system; and
transferring at least one of the addresses in the first set to the second set, wherein transferring at least one of the addresses in the first set to the second set at least partially corrects for an imbalance between a first workload on the first process and a second workload on the second process, the imbalance resulting from the first type-1 node being the only one of the first type-1 node and the second type-1 node that is assigned a communication link for transmitting data to the replication system.

16. The non-transitory computer-readable medium of claim 15, wherein the first type-1 node and the first type-2 node include respective threads that are instantiated within the first processes, and the second type-1 node and the second type-2 node include respective threads that are instantiated within the second process.

17. The non-transitory computer-readable medium of claim 15, wherein:
the first type-1 node is configured to: (i) provide to the first type-2 node any incoming I/O requests that are associated with an address from the first set; and (ii) provide to the second type-2 node any incoming I/O requests that are associated with an address from the second set, and
the second type-1 node is configured to: (i) provide to the first type-2 node any incoming I/O requests that are associated with an address from the first set; and (ii) provide to the second type-2 node any incoming I/O requests that are associated with an address from the second set.

18. The non-transitory computer-readable medium of claim 15, wherein the first type-1 node includes a first R-node node, the first type-2 node includes a first C-node, the second type-1 node includes a second R-node, and the second type-2 node includes a second C-node.

19. The non-transitory computer-readable medium of claim 15, wherein the first process includes a first operating system process and the second process includes a second operating system process.

20. The non-transitory computer-readable medium of claim 15, further comprising, storing in a memory, a data structure that: (i) maps a first definition of the first set to the first type-2 node and (ii) maps a second definition of the second set to the second type-2 node, wherein transferring the at least one of the addresses in the first set to the second set includes removing the address from the first definition and adding the address to the second definition.

\* \* \* \* \*